US005753805A

United States Patent [19]

Maloney

[11] Patent Number: 5,753,805

[45] Date of Patent: May 19, 1998

[54] METHOD FOR DETERMINING PNEUMATIC STATES IN AN INTERNAL COMBUSTION ENGINE SYSTEM

[75] Inventor: Peter James Maloney, Dearborn, Mich.

[73] Assignee: General Motors Corporation, Detroit, Mich.

[21] Appl. No.: 759,276

[22] Filed: Dec. 2, 1996

[51] Int. Cl.[6] .............................. G01M 15/00

[52] U.S. Cl. .............................. 75/118.2; 73/115; 701/103

[58] Field of Search .............................. 73/115, 116, 117.2, 73/117.3, 118.1, 118.2; 340/439, 451; 364/431.03, 431.051; 701/101, 103

[56] References Cited

U.S. PATENT DOCUMENTS

| | | | |
|---|---|---|---|
| 4,984,456 | 1/1991 | Takahashi | 73/118.2 |
| 5,003,950 | 4/1991 | Kato et al. | 73/118.2 |
| 5,008,824 | 4/1991 | Clark et al. | 73/118.2 |
| 5,070,846 | 12/1991 | Dudek et al. | 73/118.2 |
| 5,094,213 | 3/1992 | Dudek et al. | 123/478 |
| 5,377,112 | 12/1994 | Brown, Jr. et al. | 73/118.2 |
| 5,465,617 | 11/1995 | Dudek et al. | 73/118.2 |
| 5,497,329 | 3/1996 | Tang | 364/431.05 |
| 5,631,412 | 5/1997 | Tomisawa | 73/118.2 |
| 5,635,634 | 6/1997 | Reuschenbach et al. | 73/118.2 |
| 5,635,635 | 6/1997 | Tsukada et al. | 73/118.2 |

*Primary Examiner*—George M. Dombroske
*Attorney, Agent, or Firm*—Vincent A. Cichosz

[57] ABSTRACT

An internal combustion engine system includes a plurality of pneumatic elements including pneumatic resistances, pneumatic capacitances, and pneumatic sources. A pneumatic state model determines a pressure rate of change and pressure for certain areas of the internal combustion engine system designated as pneumatic nodes from selected flows of gas mass associated with pneumatic elements coupled to the certain areas.

25 Claims, 5 Drawing Sheets

METHOD FOR DETERMINING PNEUMATIC STATES IN AN INTERNAL COMBUSTION ENGINE SYSTEM

TECHNICAL FIELD

The present invention is related to the field of engine controls for internal combustion engines and more particularly is directed toward determination of intake port flow as used in such controls.

BACKGROUND OF THE INVENTION

This application is related to Attorney Docket No. H-195194 co-pending application Ser. No. 08/759,277, entitled "Internal Combustion Engine Intake Port Flow Determination", assigned to the same assignee and filed concurrently with this application.

Internal combustion engine fueling, exhaust gas recirculation and canister purge control require an accurate measure of the rate at which flow moves through each respective subsystem for control of emissions and comprehensive component diagnostics. "Mass airflow" as it is commonly referred to must be determined in order that the air/fuel ratio be controlled to a predetermined ratio in accordance with well known performance and emissions objectives. This is true whether the fuel is metered to individual cylinders such as with well known port fuel injection or with single point fuel injection, the former requiring even more stringent requirements in the accuracy and responsiveness of the mass airflow estimates. Generally, it is desirable to control the amount of fuel metered such that a stoichiometric ratio of fuel to air is achieved. This is primarily due to emissions considerations in modern automobiles which employ three-way catalytic converters for treating undesirable exhaust gas constituents. Deviations from stoichiometry may result in undesirable increases in one or more exhaust gas constituent as well as vehicle performance degradation. Accuracy in air mass flow data is therefore desirable.

Various mass air flow estimation techniques are known including general categories of direct apparatus measurement upstream of the intake manifold which requires filtering to establish accurate correspondence at the engine intake ports, and indirect predictive estimations at the point of fueling in the intake port. The former technique employs a mass air flow sensor or meter which may take various forms including hot wire anemometers and deflection plate sensors. The latter technique generally employs some form of a speed-density calculation. Regardless, all applications must use some estimation technique to determine mass flow at the engine intake ports.

Air meters are conventionally located upstream of the intake manifold thereby introducing significant travel distance for ingested air as well as certain undesirable flow characteristics such as pulsations and backflow, and volumetric parameters due to the plumbing between the meter and the cylinder ports which may include zip tube, plenum, and individual intake runners. These characteristic features produce time lag between mass airflow sensor data acquisition and actual cylinder events which may become especially disruptive during transient operating conditions. Additionally, it is also known that intake tuning effects may adversely influence typical hot-wire mass airflow sensor readings at least during certain engine operating ranges.

Known speed-density methods provide a cost-effective and generally more robust alternative to mass airflow sensing hardware. Such speed density methods are based upon measures of intake manifold gas temperature, manifold absolute pressure and engine speed and may provide for improved accuracy over mass airflow meters during transient operation. An exemplary speed density method is shown in U.S. Pat. No. 5,094,213 assigned to the assignee of the present invention. Disclosed in that reference is a method of predicting future vehicle engine states comprising model-based prediction and measurement based correction for engine control functions such as air-fuel ratio control.

However, it is recognized that speed density approaches are susceptible to bias errors from slowly changing parameters such as barometric pressure, temperature and inlet air dilution from recirculated engine exhaust gas if not accounted for properly. U.S. Pat. No. 5,465,617 also assigned to the present assignee describes a system incorporating air rate information from an airflow meter into a volumetric efficiency correction to account for bias errors to which the speed density approach may be susceptible. While such an approach improves upon the state of the art, it comes at a cost of requiring both mass airflow sensing hardware and system controller throughput and generally doesn't work well on small engines since reversion/backflow occurs significantly in a large portion of engine operating range. U.S. Pat. No. 5,497,329 also describes a mass airflow prediction technique which includes empirically determined calibration data sets of volumetric efficiency as related to engine speed and manifold absolute pressure. Additionally, further calibration data sets relating volumetric efficiency to such variable operating conditions as exhaust gas recirculation and idle air bypass may be constructed.

The mass airflow techniques heretofore described require substantial calibration through constructed data sets derived from empirical data. Such techniques generally require on vehicle calibrations that must be re-performed for the entire engine system anytime one or more components or operative characteristics thereof are changed.

SUMMARY OF THE INVENTION

Accordingly, the present invention is a method for determining pneumatic states in an internal combustion engine system. The internal combustion engine system includes a plurality of pneumatic elements with gas flow ports and a plurality of pneumatic flow branches that couple the gas flow between various ones of the plurality of pneumatic elements.

In accord with one aspect of the present invention, at least one location within the internal combustion engine system is designated as a pneumatic node. Generally, pneumatic nodes are understood to be relatively substantial volumetric areas such as manifolds or other substantial engine system volumes. Pneumatic parameters associated with certain selected pneumatic elements that are coupled to the pneumatic node are provided from the group of pneumatic parameters including upstream and downstream pressures, geometric or other flow altering characteristics and flow forcing inputs in accordance with the type of pneumatic element. Pneumatic elements are generally categorized as pneumatic resistance elements which may have fixed or variable flow geometries, pneumatic capacitance elements such as substantial fixed volumes, and pneumatic source elements which force flows through the engine system. A first pneumatic state, pressure rate of change, of the at least one pneumatic node is determined from a predetermined relationship of the set of pneumatic parameters.

In accordance with one aspect of the invention, the pressure rate of change is determined from an aggregation of respective gas mass flows through the selected pneumatic elements. Gas mass flows are preferably determined for each element as a function of certain pneumatic parameters associated with the respective element. A standard gas mass flow is determined which, if appropriate, is then corrected for actual conditions by density correction factors as functions of temperature and pressure. The aggregation of gas mass flows is preferably damped in accordance with a predetermined damping factor which is a function of the node volumetrics.

In accord with another aspect of the invention, a second pneumatic state, pressure, at the pneumatic node is determined as a predetermined function of the first pneumatic state, pressure rate of change. Preferably, the pressure rate of change is numerically integrated to determine the pressure from the pressure rate of change.

The various general varieties of pneumatic elements in the internal combustion engine system determine the pneumatic parameters which are used to determine the gas mass flow therethrough. Generally, the gas mass flow through a pneumatic resistance element is determined as a predetermined function of upstream and downstream pressure. Additionally, such elements may further include variable flow geometries and hence an additional parameter of such geometry is incorporated into the predetermined function for determining the gas mass flow. Pneumatic capacitance elements are generally characterized by substantial fixed volumes and the net gas mass flow corresponding thereto is preferably damped with a factor dependent upon the element volumetrics. The gas mass flow through a pneumatic source element is determined as a function of upstream and downstream pressure, a forcing input such as engine speed in the case of a combustion cylinder and intake port flow.

BRIEF DESCRIPTION OF THE DRAWINGS

The present invention will now be described, by way of example, with reference to the accompanying drawings, in which.

DESCRIPTION OF THE PREFERRED EMBODIMENT

Figure 5:
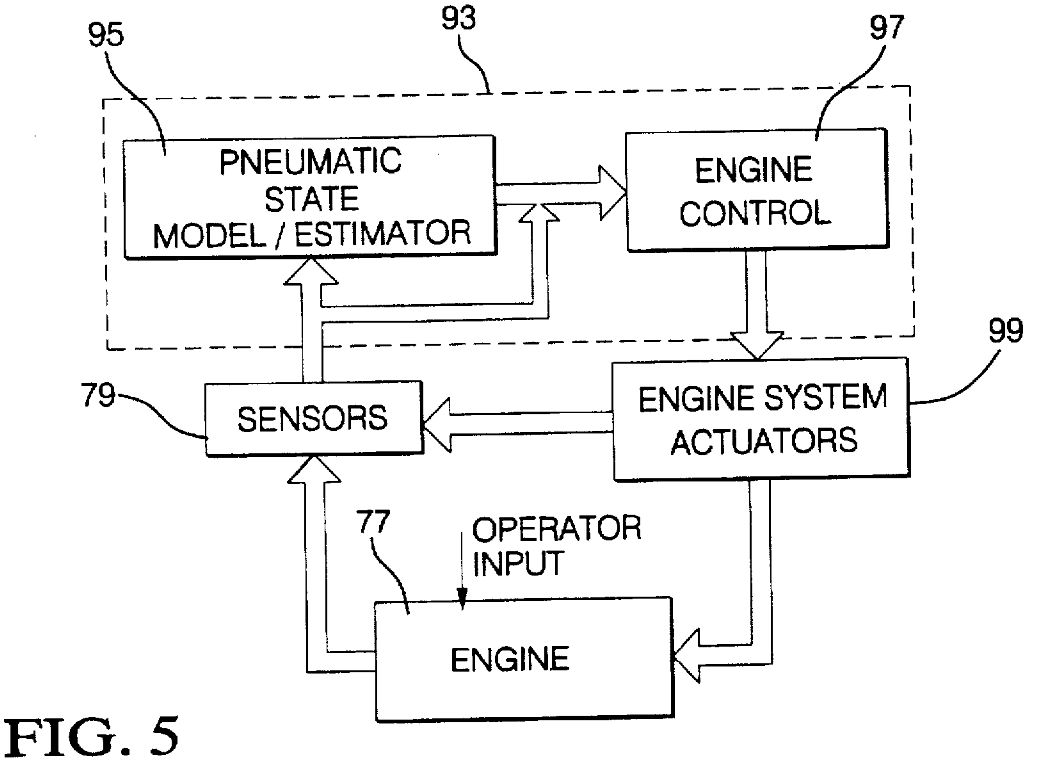
FIG. 5 is a schematic diagram of an internal combustion engine system including sensor, actuator, and operator interfaces.

Referring first to FIG. 5, a block diagram of an exemplary internal combustion engine system and control architecture in accordance with the present invention is shown. Engine 77 comprises a conventional internal combustion engine including at least one combustion chamber and cylinder and conventional intake, exhaust, fueling and in the case of spark ignited engines spark ignition sub-systems. A host of engine operating parameters and conditions are transduced by conventional sensors 79 including coolant temperature, engine RPM (RPM), outside air temperature, manifold absolute pressure (MAP), throttle position and exhaust gas recirculation valve position. Operator input 96 exemplifies operator demand for engine torque and essentially comprises altering throttle plate (not shown) position through conventional mechanical linkages. Throttle plate position is transduced 79 and provides throttle position information. Alternatively, in so called drive by wire systems, operator input may comprise transducing accelerator pedal position into a wheel torque request which is responded to by altering the throttle plate by way of an actuator controlled throttle plate. Of these and various other sensor inputs, RPM and MAP are specifically utilized in pneumatic state model/estimator block 95. Other ones of the sensor inputs are utilized, together with outputs from the pneumatic state model/estimator block 95 as control inputs to engine control block 97 which controls various well known engine functions, such as fueling, ignition timing, and idle speed regulation in response thereto. Engine control block 97 may also comprise various diagnostic routines dependent upon the various state and sensed inputs as described. Engine control 97 provides a variety of outputs to engine system actuator block 99 for performing the desired control functions upon the engine 77. The outlined box 93 comprising pneumatic state model/estimator block 95 and engine control block 97 corresponds to a computer based powertrain control module (PCM) which performs the basic functions in carrying out the present invention. PCM 93 is a conventional computer based controller conventionally used in the automotive field and includes a microprocessor, ROM, RAM, and various I/O devices including A/D and D/A converters.

Figure 1:
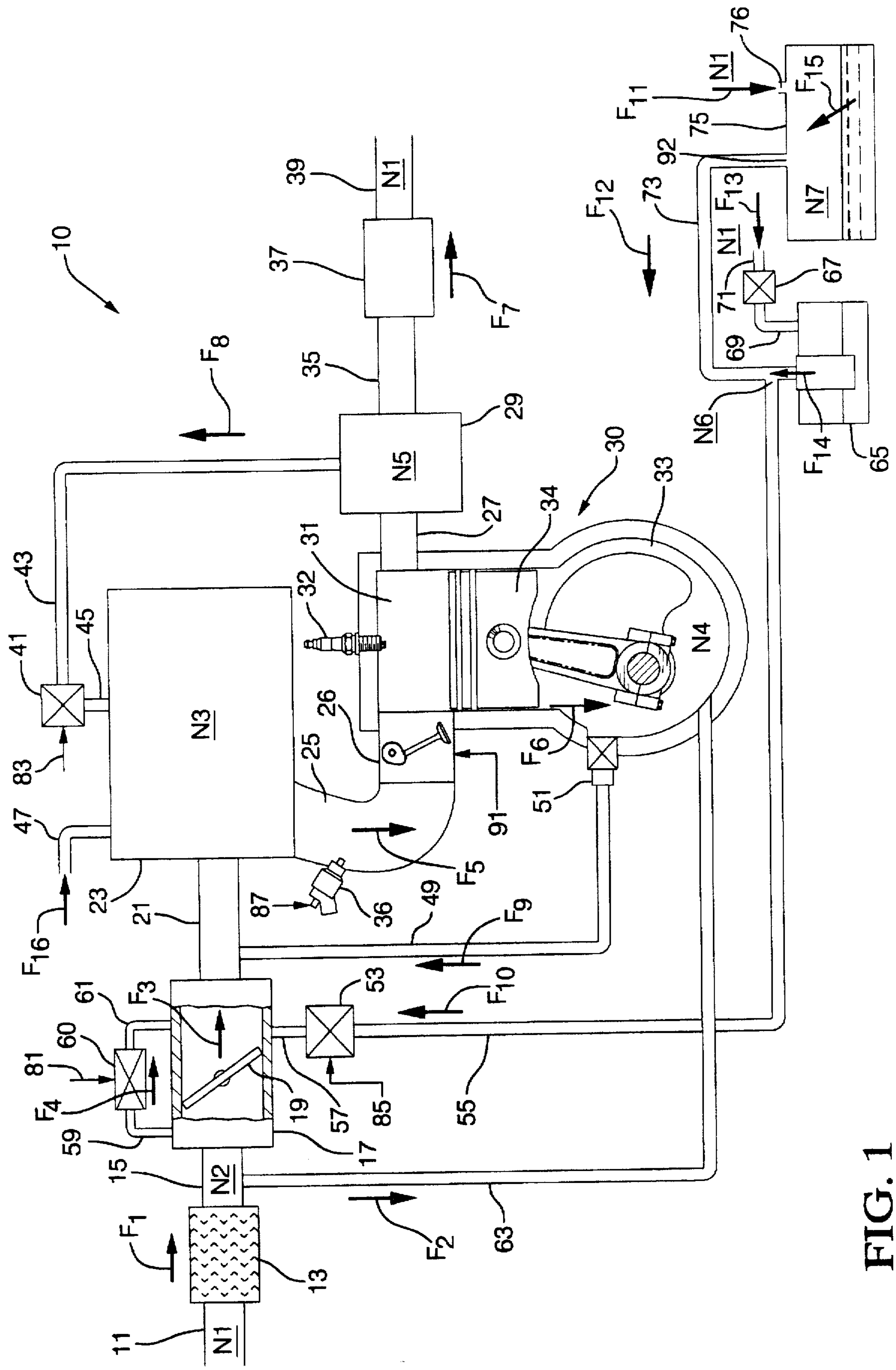
FIG. 1 is a schematic diagram of a spark ignited internal combustion engine system in accordance with the present invention.

Turning now to FIG. 1, a schematic model of a spark ignited internal combustion engine system (System) is illustrated. The System, in the most general sense, comprises all engine associated apparatus affecting or affected by gas mass flow and includes the operating environment or atmosphere from which and to which gas mass flows. The System is labeled with a plurality of pneumatic volume nodes designated by underlined combinations of upper case 'N' and a numeral. For example, the atmosphere is designated as pneumatic volume node N1 and is shown at the fresh air inlet 11, exhaust outlet 39, canister purge vent conduit 71 and fuel tank leak orifice 76. The System is also labeled with a plurality of gas mass flows designated by bold arrows and combinations of upper case 'F' and a subscripted numeral. For example, gas mass flow $F_1$ corresponds to gas mass flow through air cleaner 13 from pneumatic volume node N1 to pneumatic volume node N2.

The System includes a variety of pneumatic elements, each generally characterized by at least a pair of ports through which gas mass flows. For example, air induction including fresh air inlet 11, air cleaner 13, and intake duct 15 is a first general pneumatic element having ports generally corresponding to the air inlet 11 at one end and another port generally corresponding to the intake duct 15 at the other end. Another example of a pneumatic element is intake manifold 23 having ports interfacing at brake booster conduit 47, exhaust gas recirculation (EGR) conduit 45, intake duct 21, intake runner 25, positive crankcase ventilation (PCV) conduit 49, and canister purge valve (CPV) conduit 57. Other general examples of pneumatic elements in the System include: idle air bypass valve 60; intake air throttle including throttle body 17 and throttle plate 19; canister purge valve (CPV) 53; positive crankcase ventilation (PCV) valve 51; PCV fresh air conduit 63; crankcase 33; EGR valve 41; combustion cylinder including combustion chamber 31 and intake valve and cam 26; canister purge vent 67; tank vapor orifice 92; exhaust including exhaust duct 35, catalyst and muffler 37 and exhaust outlet 39. The various elements shown in FIG. 1 are exemplary and the present invention is by no means restricted only to those specifically called out. Generally, an element in accordance with the present invention may take the form of a simple conduit or orifice (e.g. exhaust), variable geometry valve (e.g. throttle), pressure regulator valve (e.g. PCV valve), major volumes (e.g. intake and exhaust manifolds), or pneumatic pump (e.g. combustion cylinder).

In illustration of the interrelatedness of the various elements and flow paths in the internal combustion engine system 10, a gas mass (gas) at atmospheric pressure at node N1 enters through fresh air inlet 11 passing through air cleaner 13—flow $F_1$. Gas flows from intake duct 15 through throttle body 17—flow $F_3$. For a given intake manifold pressure, the position of throttle plate 19 is one parameter determining the amount of gas ingested through the throttle body and into the intake duct 21. From intake duct 21, gas enters intake manifold 23, generally designated as pneumatic volume node N3, whereat individual intake runners 25 route gas into individual combustion cylinders 30—flow $F_5$. Gas is drawn through cam actuated intake valve 26 into combustion cylinder 30 during piston downstroke and exhausted therefrom through exhaust runner 27 during piston upstroke. These intake and exhaust events are of course separated by compression and combustion events in full four cycle operation. Gas continues through exhaust manifold 29 also labeled as pneumatic volume node N5. From there, gas flows through catalyst and muffler 37 and finally through exhaust outlet 39 to atmosphere node N1—flow $F_{12}$.

The System illustrated, of course, also has positive crankcase ventilation which provides for continuous feed of a portion of the gas—flow $F_2$—from intake duct 15, generally designated as pneumatic volume node N2 in the figure, into crankcase 33 by way of PCV fresh air conduit 63. The crankcase vapors are separated from oil and continually drawn down through PCV valve 51 and PCV conduit 49 into intake duct 21—flow $F_9$.

At engine idle conditions, generally corresponding to a released throttle, idle air bypass valve 60 routes a small amount of gas—flow $F_4$—around the closed throttle plate 19 by way of idle air bypass conduits 59 and 61. Idle air bypass valve may be a conventional pintle valve or other well known arrangements. Idle air control line 81 from PCM 93 controls the position of idle air control valve 60.

A portion of the exhaust gas may be drawn out of the exhaust manifold 29 through EGR conduit 43, EGR valve 41 and conduit 45 and into intake manifold 23—flow $F_8$—in accordance with well known emission objectives. EGR control line 83 establishes the position of the EGR valve 41 which may take the form of a conventional linearly actuated valve. The position of EGR valve, and hence the valve effective geometry, is indicated such as by a conventional position transducer, for example a rheostat.

A minor gas flow may be established through brake boost conduit 47 into intake manifold 23—flow $F_{16}$—during the application of the service brake pedal (not shown) as is well known in the art.

Vehicles equipped with well known evaporative emission controls may also have gas flow through a canister purge valve (CPV) 53 and CPV conduits 55 and 57—flow $F_{10}$—into throttle body 17 downstream of throttle plate 19 as generally illustrated, but the actual and effective flow is into intake manifold 23 node N3. Charcoal canister 65 generally gives up fuel vapors—flow $F_{14}$—as fresh air—flow $F_{13}$—is drawn through purge vent 67 and purge vent conduits 69 and 71. Fuel tank 75 may also provide fuel vapors—flow $F_{15}$—which may be absorbed in canister 65 or consumed by the engine. Fuel tank 75 is also illustrated with a leak orifice 76 through which fresh air—flow $F_{11}$—may enter. Gas flow from the fuel tank—$F_{12}$—occurs through conventional rollover valve 92 through tank vapor recovery conduit 73.

In accordance with the present invention, various relatively substantial volumetric regions of the internal combustion engine system are designated as pneumatic volume nodes at which respective pneumatic states are desirably estimated. The pneumatic states are utilized in determination of gas mass flows which are of particular interest in the control functions of an internal combustion engine. For example, mass airflow through the intake system, and specifically at the point of fueling, is desirably known for development of appropriate fueling commands by well known fueling controls.

As described, the internal combustion engine is generally broken down into a variety of interconnected elements. These elements and interconnections provide the basis for the pneumatic state determinations through the pneumatic state model of the present invention performed in accord with compressible gas flow estimations. Each of the various elements has unique pneumatic characteristics and each is generally categorized for purposes of the present invention into one of three predefined categories: pneumatic resistance, pneumatic capacitance, and pneumatic flow source.

Pneumatic resistance elements are generally characterized by a non-linear correspondence between mass flow and pressure ratio of upstream and downstream gas pressures. In simplest form, an exemplary internal combustion engine pneumatic resistance element comprises a simple tube or orifice having fixed restriction geometry such as, for example, the exhaust system from exhaust duct 35 though exhaust outlet 39 in FIG. 1. A somewhat more complicated form of pneumatic resistance element comprises variable geometry valves such as, for example, a throttle valve or EGR valve. As a matter of practice, the geometry of such variable valves may be approximated by known relationships between a control signal applied to an associated actuator or through conventional transducer indicating an absolute position of the valve. Yet a further form of pneumatic resistance element comprises a pressure regulator valve such as, for example, a conventional positive crankcase ventilation (PCV) valve.

Pneumatic capacitance elements are generally characterized by relatively substantial fixed volumes yielding a mass storage capacity for compressible gas flowing into the element. An exemplary internal combustion engine pneumatic capacitance element comprises a fixed volume such as, for example, the intake manifold 23 in FIG. 1.

Figure 2:
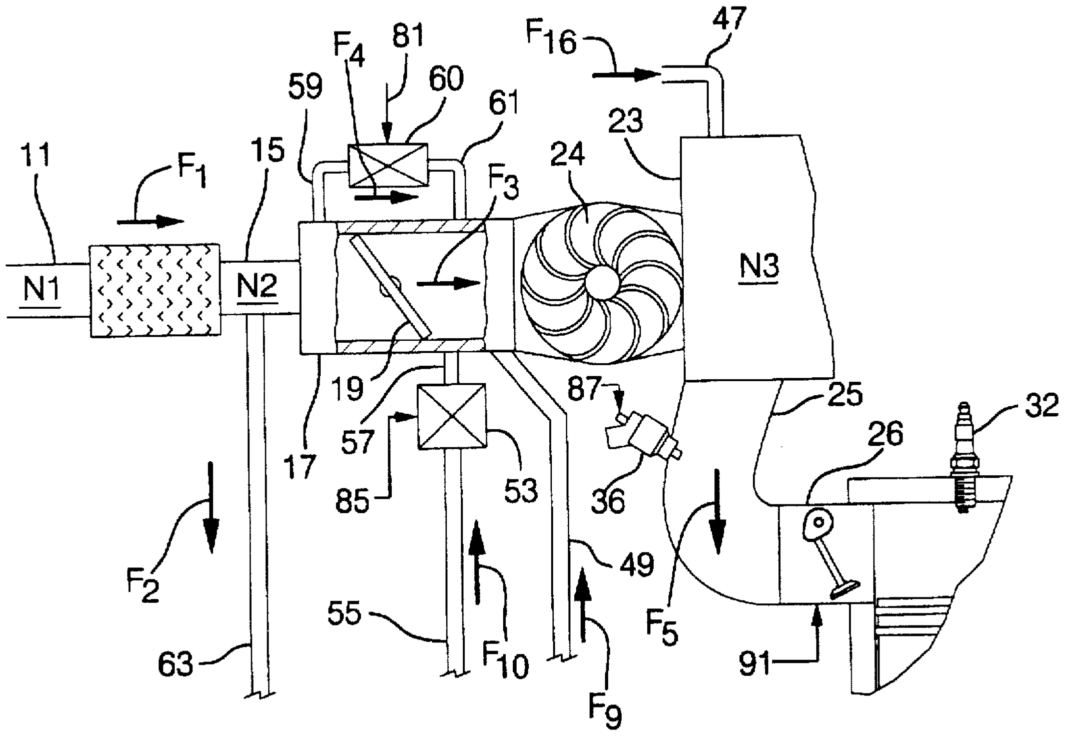
FIG. 2 is a schematic diagram of a portion of the internal combustion engine system illustrated in FIG. 1 additionally including a schematic diagram of a supercharger.
Figure 3:
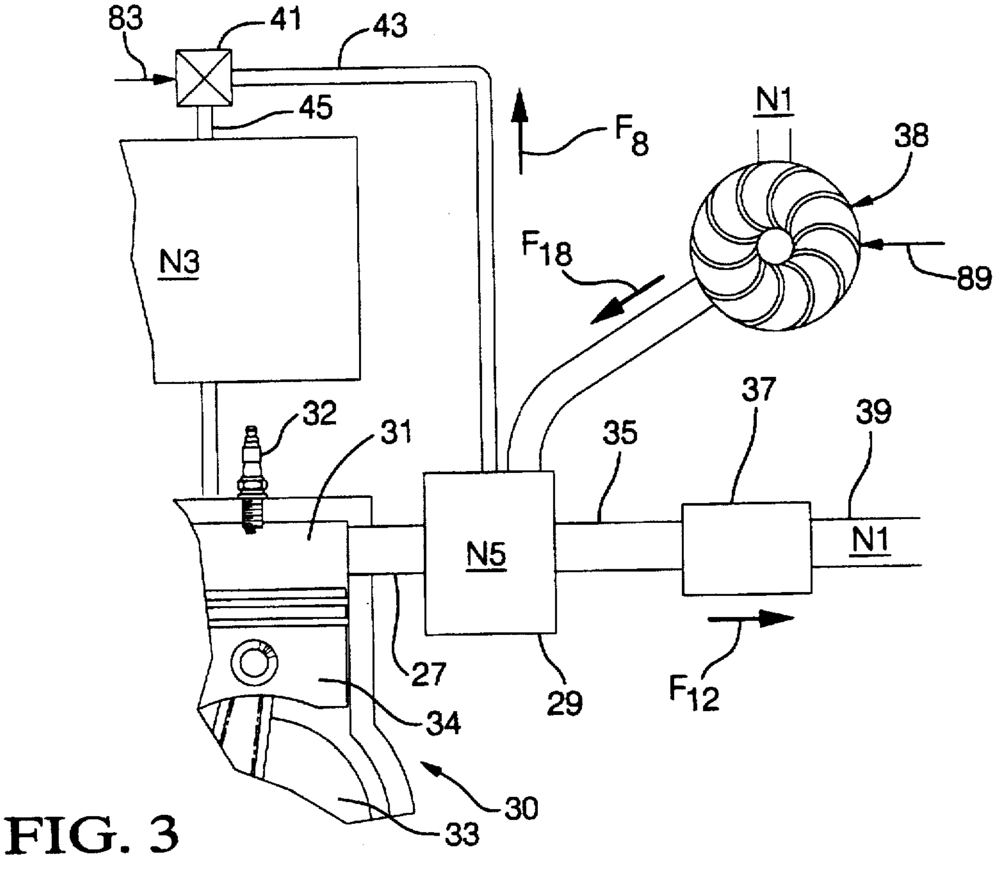
FIG. 3 is a schematic diagram of an exhaust portion of the internal combustion engine system illustrated in FIG. 1 additionally including a schematic diagram of an electrically driven A.I.R. pump.

Pneumatic flow source elements are generally characterized by mechanical apparatus responsive to some input force effective to pump gas therethrough. An exemplary pneumatic flow source element comprises combustion cylinder 30 in FIG. 1 which individually and in conjunction with a bank of additional similar cylinders is effective to intake and exhaust gas to force gas flow through the internal combustion engine system. Of course, the input force is provided by way of cyclically combusted fuel charges comprising ingested gas and fuel such as from fuel injector 36 responsive to fueling signal on line 87 and combusted in accordance with a spark from spark plug 32. FIGS. 2 and 3 illustrate other exemplary pneumatic flow source elements as parts of the intake and exhaust, respectively. Numerals which are repeated between the FIGS. 1–3 correspond to like features which if once described previously will not be repeated herein. FIG. 2 is representative of any variety of supercharger or turbocharger, labeled 24, functionally equivalent in the sense that an input force generally drives an impeller for pumping gas from the downstream end of throttle body 17 into the intake manifold 23. A Supercharger is generally understood in the art to comprise a driving force mechanically coupled to the engine output such as through an accessory drive arrangement while a turbocharger is generally understood in the art to comprise a driving force consisting of system exhaust gases coupled to a turbine in rotational coupling with the pump impeller. FIG. 3 is generally representative of an air injection reaction (AIR) pump 38 effective to force atmospheric gas into the exhaust manifold 29 for well known catalytic emission objectives. Preferably, AIR pump 38 has a forcing input comprising an electrical motor speed responsive to an applied voltage via line 89 as illustrated.

Gas mass flow through pneumatic resistance elements is generally modeled in the present invention in accordance with compressible flow functions for an ideal gas through a restriction. More specifically, standard gas mass flow ($\dot{M}_{std}$) through a fixed geometry pneumatic resistance element may be expressed as a function of the pneumatic parameters downstream pressure ($P_d$) and upstream pressure ($P_u$) as follows:

$$\dot{M}_{std} = f\left(\frac{P_d}{P_u}\right) \tag{1}$$

Density correction factors as respective functions of pneumatic parameters upstream pressure $P_u$ and upstream temperature ($T_u$) applied to the standard gas mass flow provide for a gas mass flow estimate through a fixed geometry pneumatic resistance element. Gas mass flow ($\dot{M}$) through a fixed geometry pneumatic resistance element may generally be expressed as follows:

$$\dot{M} = f(P_u)\cdot f(T_u)\cdot f\left(\frac{P_d}{P_u}\right) \tag{2}$$

Gas mass flow through a variable geometry valve (e.g. throttle valve or EGR valve) introduces a degree of freedom with respect to the restriction geometry. As such, gas mass flow therethrough may similarly be modeled in the present invention in accordance with compressible flow functions for an ideal gas based upon the aforementioned pneumatic parameters and further as a function of a geometric pneumatic parameter of valve geometry (θ). In such case, gas mass flow ($\dot{M}$) through a variable geometry pneumatic resistance element may generally be expressed as follows:

$$\dot{M} = f(P_u)\cdot f(T_u)\cdot f\left(\theta, \frac{P_d}{P_u}\right) \tag{3}$$

Compressible flow functions modeling standard gas mass flow ($\dot{M}_{std}$) through pressure regulator valves such as, for example, a conventional positive crankcase ventilation (PCV) valve, may be expressed as a function of the pneumatic parameters downstream pressure ($P_d$) and upstream pressure ($P_u$) as follows:

$$\dot{M}_{std} = f(P_u, P_d) \tag{4}$$

A density correction factor as a function of pneumatic parameter upstream temperature $T_u$ applied to the standard gas mass flow yields gas mass flow through a pressure regulator valve as follows:

$$\dot{M} = f(T_u) f(P_u, P_d) \tag{5}$$

Transient effects of gas mass stored in a substantial volume (i.e. pneumatic capacitance element) such as an intake manifold are generally modeled in the present invention in accordance with the net gas mass in the fixed volume of such pneumatic capacitance element. At any given instant, the finite gas mass ($M_{net}$) contained in the pneumatic capacitance element of interest may be expressed in terms of the well known ideal gas law:

$$PV = M_{net} RT \tag{6}$$

where P is the average pressure in the volume, V is the volume of the pneumatic capacitance element, R is the universal gas constant for air, and T is the average temperature of the gas in the volume. Differentiation of equation (6) with respect to time yields the relationship between gas mass flow ($\dot{M}_{net}$) and pressure rate of change ($\dot{P}$) as follows:

$$\dot{P} = \frac{RT}{V}\dot{M}_{net} + P\frac{\dot{T}}{T} \tag{7}$$

wherein the pressure rate of change in a volume is related to the net mass flow into the volume by a capacitance factor $$\frac{RT}{V},$$

or put another way by a damping factor which is a volumetric function of the pneumatic capacitance element. A secondary effect embodied in the term $$P\frac{\dot{T}}{T}$$

is generally less than approximately ten percent of the pressure rate of change and is neglected in the exemplary embodiments; however, the secondary effects term may in fact be included in any reduction to control implementation. Therefore, as modeled, the intake manifold for example, having a plurality of gas mass flows ported thereto, has a net gas mass flow into or out of its volume established essentially as a summation of the individual gas mass flows. Application of the damping factor of the pneumatic capacitance element yields a pressure rate of change within the volume which may be integrated to arrive at pressure.

Pumping effects of a flow source on intake gas mass flow, for example due to the engine and effecting the gas mass flow at the engine intake ports, may be approximated by the well known speed-density equation expressed as:

$$\dot{M}_{intake} = \frac{P_m V_d N_e}{2RT_m}\eta_v \tag{8}$$

where $\dot{M}_{int\,ake}$ is the gas mass flow at the intake ports of the engine, $P_m$ is the intake manifold pressure, $T_m$ is the intake manifold gas temperature, $V_d$ is the total engine displacement, $N_e$ is the engine speed in RPM, $\eta_v$ is the manifold referenced volumetric efficiency for static ideal effects, and R is the gas constant of the gas mixture at the intake ports. Volumetric efficiency is known to be reasonably expressed as a function of the intake port gas to air molecular weight ratio, air to fuel ratio, compression ratio, specific heat ratio and exhaust pressure to intake pressure ratio. The present invention assumes that the air to fuel ratio does not vary significantly from the settings under which engine breathing is normally calibrated. In fact, air to fuel ratio swings from about 10 to about 20 may effect volumetric efficiency only approximately 4%. Furthermore, the molecular weight of the intake port gas does not change significantly around a given base calibration. Thus, the present invention approximates the volumetric efficiency as follows:

$$\eta_v = A + B\frac{P_e}{P_m} \tag{9}$$

where A and B are functions of compression ratio and specific heat ratio, and $P_e$ is exhaust manifold pressure. Since dynamic effects related to piston speed and tuning are generally significant, the arguments A and B derived at constant RPM conditions are alternatively expressed as a function of the engine RPM or $N_e$ as follows:

$$A=f(N_e) \tag{10}$$

$$B=f(N_e) \tag{11}$$

Substituting equations (9) through (11) into equation (8) yields a simplified expression for the gas mass flow at the intake ports of the engine:

$$\dot{M}_{intake} = \frac{P_m V_d N_e}{2RT_m}\left[A(N_e) + B(N_e)\frac{P_e}{P_m}\right] \tag{12}$$

Gas mass flow at the intake ports of the engine at standard conditions of pressure and temperature yields the equation:

$$\dot{M}_{std} = \left[\frac{P_{std}T_m}{P_m T_{std}}\right]\frac{P_m V_d N_e}{2RT_m}\left[A(N_e) + B(N_e)\frac{P_e}{P_m}\right] \tag{13}$$

which most conveniently reduces to a standard gas mass flow argument, and pressure and temperature density correction arguments in the equation:

$$\dot{M}_{intake} = f(T_m)\cdot f(P_m)\cdot f\left(N_e, \frac{P_e}{P_m}\right) \tag{14}$$

A special case for intake systems comprising variable valve timing further includes an additional dimensional argument corresponding to the timing and may be consolidated within the standard gas mass flow argument as follows:

$$\dot{M}_{std} = f\left(\theta, N_e, \frac{P_e}{P_m}\right) \tag{15}$$

The related gas mass flow commonly referred to as blow by characterized by leakage flow through gaps in the piston rings and other leak paths during combustion into the engine crankcase is generally expressed as follows in the present invention:

$$M_{bby}=f(MAP, N_e) \tag{16}$$

In accord with the present invention, at least one location in the internal combustion engine system is designated as a pneumatic volume node. A variety of gas mass flow ports may be associated with the predetermined location. For example, with reference to FIG. 1, intake manifold 23 may arbitrarily be selected. As such, a variety of gas mass flows illustrated as respectively labeled heavy arrows are illustrated entering and exiting the intake manifold 23. Flow $F_3$ from throttle body 17 and flow $F_9$ from the crankcase enter through intake duct 21 as do flows $F_4$ from idle air bypass valve 60 and flow $F_{10}$ from CPV conduits 55,57 and CPV valve 53. Flow $F_{16}$ provides a flow from brake booster (not shown) and flow $F_8$ comprising recirculated exhaust gas is controllably introduced from exhaust manifold 29 by way of EGR valve 41. Flow $F_5$ out of the intake manifold 23, is of course associated with an intake runner 25 and may be controlled to a degree by way of intake valve and cam 26 in accord with cam timing or cam phase signal on line 91. Cam timing may be controlled by any of a variety of well known cam phaser apparatus including, for example, electro-hydraulically actuated cam phasers. Some exemplary cam phasers may be found in U.S. Pat. Nos. 5,033,327, 5,119,691 and 5,163,872, and U.S. patent application Ser. No. 08/353,776, all assigned to the assignee of the present invention. Additionally, cam phase timing may be implemented by way of direct hydraulic valve actuation in so called "camless" applications. Advantageously, hydraulically actuated valves may be controlled with additional freedom in as much as opening and closing times and valve lift may be adjusted independently in accordance with desired objectives.

Recalling from equation (7) above, the pressure rate of change within the intake manifold 23 may essentially be derived from net mass flow into the manifold and a capacitance or damping factor which is a volumetric function of the intake manifold 23. The intake manifold pressure rate of change is therefore expressed as the summation of the individual gas mass flows '$F_n$' damped by a volumetric factor as follows:

$$\dot{P}_{N3} = \frac{RT_{N3}}{V_{N3}}\left[F_9 + F_{10} + F_3 + F_4 + F_{16} + F_8 - F_5\right] \tag{17}$$

Recalling further the gas mass flows through the various pneumatic resistance elements are in accord with the present invention generally expressed as a function of various pneumatic parameters including the downstream pressure ($P_d$) and the upstream pressure ($P_u$), flow geometry, and upstream temperatures $T_u$, the various gas mass flows of equation (17) are expanded as follows:

$$\dot{P}_{N3} = \frac{RT_{N3}}{V_{N3}}\begin{bmatrix} f_9(P_{N4}, P_{N3}, T_{N4}) + f_{10}(P_{N6}, P_{N3}, T_{N6}, \theta_{cpv}) + \\ f_3(P_{N2}, P_{N3}, T_{n2}, \theta_{tp}) + f_4(P_{N2}, P_{N3}, T_{N2}, \theta_{iac}) + \\ F_{16} + f_8(P_{N5}, P_{N3}, T_{N5}, \theta_{egr}) - f_5(P_{N3}, P_{N5}, T_{N3}, N_e, \theta_{cam}) \end{bmatrix} \tag{18}$$

Equation (18) is a node specific form of a general form of a pneumatic state equation for substantially any area of particular interest in the internal combustion engine system. In exemplary equation (18), flow through the variable geometry resistance elements (e.g. $F_3$ through throttle body 17 across variable position throttle plate 19), and source element (e.g. $F_5$ through intake runner 25) are all represented. In accordance with a preferred embodiment of the present invention, a plurality of pneumatic volume nodes are established, each of which has associated therewith a similar set of predetermined relationships of respective sets of pneumatic parameters from the group of pneumatic parameters of upstream and down stream pressures, temperature, element geometries and forcing inputs. In one exemplary embodiment as illustrated with respect to FIG. 1, the areas of the System so designated as pneumatic volume nodes include those labeled N2 through N7. The respective pressure rates of change associated with each node so designated are as follows:

$$\dot{P}_{N2}=\frac{RT_{N2}}{V_{N2}}\begin{bmatrix} f_1(P_{N1},P_{N2},T_{N1})-f_2(P_{N2},P_{N4},\times T_{N2})- \\ f_2(P_{N2},P_{N3},T_{N2},\theta_{tp})-f_4(P_{N2},P_{N3},T_{N2},\theta_{iac}) \end{bmatrix} \quad (19)$$

$$\dot{P}_{N4}=\frac{RT_{N4}}{V_{N4}}\left[f_2(P_{N2},P_{N4},T_{N2})-f_9(P_{N4},P_{N3},T_{N4})+f_6(P_{N3},P_{N5},N_e)\right] \quad (20)$$

$$\dot{P}_{N5}=\frac{RT_{N5}}{V_{n5}}\begin{bmatrix} f_5(P_{N3},P_{N5},T_{N3},N_e,\theta_{cam})f_6(P_{N3},P_{N5},N_e)- \\ f_7(P_{N5},P_{N1},T_{N5})-f_8(P_{N5},P_{N3},T_{N5},\theta_{egr}) \end{bmatrix} \quad (21)$$

$$\dot{P}_{N6}=\frac{RT_{N6}}{V_{N6}}\begin{bmatrix} f_{13}(P_{N1},P_{N6},T_{N1},\theta_{pv})+f_{12}(P_{N7},P_{N6},T_{N7})- \\ f_{10}(P_{N6},P_{N3},T_{N6},\theta_{cpv}) \end{bmatrix} \quad (22)$$

$$\dot{P}_{N7}=\frac{RT_{N7}}{V_{N7}}\left[f_{11}(P_{N1},P_{N7},T_{N1},\theta_{leak})-f_{12}(P_{N7},P_{N6},T_{N7})+F_{15}\right] \quad (23)$$

It is noted that while some of the various flows are expressed as relationships of pneumatic parameters (e.g. pressures, temperatures, geometries, and forcing inputs), other of the flows may be approximated and supplied as constants or rejected as disturbance flows. Flows from fuel tank vapor, $F_{15}$, and brake booster flow, $F_{16}$, in the present exemplary embodiment are two such flows.

The equations (18) through (23) provides a description of the System as a series of coupled equations and together generally represent one embodiment of an internal combustion engine system pneumatic state model.

Further reducing the equation set and model supplied pressure rates of change, however, may be advantageous. For example, in the present embodiment, it has been found that the flow dynamics of the combination of the fresh air inlet 11, air cleaner 13, intake duct 15, throttle body 17 and idle air bypass plumbing is relatively well damped or stiff in certain engine systems. In addition, PCV fresh air flow $F_2$ through conduit 63 may generally be ignored as insubstantial at most non-idle conditions and set to a small constant at idle. This being the case, the equations may be simplified by elimination of equation (19) calculation of pressure rate of change at node N2 since the stiffness of the combination is sufficient to allow for approximations of pressure rate of change at node N2 to be substantially zero. With a reduction as described, others of the equations may need to be modified to account for the elimination of node N2 pressure rate of change and hence pressure, and presumed insubstantiality of fresh air flow $F_2$ at non-idle conditions. In other words, the other equations directly coupled to pressure node N2 exemplified in former equation (19) are modified as follows. The flow terms $f3(P_{N2}, P_{N3}, T_{N2}, \theta_{tp})$ and $f4(P_{N2}, P_{N3}, T_{N2}, \theta_{iac})$ in Equation (18) no longer are related directly to the pressure in node N2 but are rather related to the atmospheric pressure at node N1 with appropriate accounting for the pneumatic resistance characteristics of the air cleaner 13, predominantly, and the air inlet 11 and intake duct 17 to a lesser degree. Such flow terms therefore are re-expressed in terms of the atmospheric pressure at node N1 as $f3(P_{N1}, P_{N3}, T_{N2}, \theta_{tp})$ and $f4(P_{N1}, P_{N3}, T_{N2}, \theta_{iac})$. In any case, the substantiality of the flows $F_3$ and $F_4$ both in terms of mass flow magnitude and criticality in fueling control dictates the accuracy over the entire operating range of the engine from idle to wide open throttle and including transient operating conditions. While the same general approach may be followed to relate fresh air flow term $f_2(P_{N2}, P_{N4}, T_{N2})$ of equation (20) to the atmospheric pressure at node N1, a preferred approach in light of the insubstantiality of the flow $F_2$ at non-idle conditions is to treat such flow as a constant providing an insubstantial effect at non-idle conditions. Such modifications, therefore, would be so reflected in equations (18) and (20).

In practice, the model described by equations 18–23 above will have errors mainly associated with the combined imperfections of the flow function calibrations, part variability, leaks, hardware changes during operation, and barometric pressure changes as manifested in the input $P_{N1}$.

Errors associated with model imperfections and unknown barometric pressure are preferably corrected via a conventional Leunberger Observer and Barometric Pressure Estimator, respectively.

Model imperfections are compensated for by using feedback from measurements to correct the model. In one embodiment, the MAP sensor pressure measurement is used to correct the model. A Standard Leunberger Observer is constructed by adding MAP measurement feedback terms to equations 18–23 to correct the model as shown in the equations 24–29 below.

$$\dot{\bar{P}}_{N2}=\frac{RT_{N2}}{V_{N2}}\begin{bmatrix} f_1(\bar{P}_{N1},\bar{P}_{N2},T_{N1})-f_2(\bar{P}_{N2},\bar{P}_{N4},T_{N2})- \\ f_2(\bar{P}_{N2},\bar{P}_{N3},T_{N2},\theta_{tp})-f_4(\bar{P}_{N2},\bar{P}_{N3},T_{N2},\theta_{iac}) \end{bmatrix}+ L_2(P_{N3}-\bar{P}_{N3}) \quad (24)$$

$$\dot{\bar{P}}_{N3}=\frac{RT_{N3}}{V_{N3}}\begin{bmatrix} f_9(\bar{P}_{N4},\bar{P}_{N3},T_{N4})+f_{10}(\bar{P}_{N6},\bar{P}_{N3},T_{N6},\theta_{cpv})+ \\ f_3(\bar{P}_{N2},\bar{P}_{N3},T_{n2},\theta_{tp})+f_4(\bar{P}_{N2},\bar{P}_{N3},T_{N2},\theta_{iac})+ \\ F_{16}+f_8(\bar{P}_{N5},\bar{P}_{N3},T_{N5},\theta_{egr})- \\ f_5(\bar{P}_{N3},\bar{P}_{N5},T_{N3},N_e,\theta_{cam}) \end{bmatrix}+ L_3(P_{N3}-\bar{P}_{N3}) \quad (25)$$

$$\dot{\bar{P}}_{N4}=\frac{RT_{N4}}{V_{N4}}\begin{bmatrix} f_2(\bar{P}_{N2},\bar{P}_{N4},T_{N2})-f_9(\bar{P}_{N4},\bar{P}_{N3},T_{N4})+ \\ f_6(\bar{P}_{N3},\bar{P}_{N5},N_e) \end{bmatrix}+L_4(P_{N3}-\bar{P}_{N3}) \quad (26)$$

$$\dot{\bar{P}}_{N5}=\frac{RT_{N5}}{V_{n5}}\begin{bmatrix} f_5(\bar{P}_{N3},\bar{P}_{N5},T_{N3},N_e,\theta_{cam})-f_6(\bar{P}_{N3},\bar{P}_{N5},N_e)- \\ f_7(\bar{P}_{N5},\bar{P}_{N1},T_{N5})-f_8(\bar{P}_{N5},\bar{P}_{N3},T_{N5},\theta_{egr}) \end{bmatrix}+ L_5(P_{N3}-\bar{P}_{n3}) \quad (27)$$

$$\dot{\bar{P}}_{n6}=\frac{RT_{N6}}{V_{N6}}\begin{bmatrix} f_{13}(\bar{P}_{N1},\bar{P}_{N6},T_{N1},\theta_{pv})+f_{12}(\bar{P}_{N7},\bar{P}_{N6},T_{N7})- \\ f_{10}(\bar{P}_{N6},\bar{P}_{N3},T_{N6},\theta_{cpv}) \end{bmatrix}+ L_6(P_{N3}-\bar{P}_{N3}) \quad (28)$$

$$\dot{\bar{P}}_{N7}=\frac{RT_{N7}}{V_{N7}}\begin{bmatrix} f_{11}(\bar{P}_{N1},\bar{P}_{N7},T_{N1},\theta_{leak})- \\ f_{12}(\bar{P}_{N7},\bar{P}_{N6},T_{N7})+F_{15} \end{bmatrix}+L_7(P_{N3}-\bar{P}_{N3}) \quad (29)$$

The Leunberger observer form provides MAP feedback to force $\bar{P}_{N3}$ to match the measured MAP $P_{N3}$ at steady-state conditions, but causes the modeled states (marked with the overbar) to lead the actual states during transients. The lead is adjustable via the Leunberger gains L. Any measurement can be chosen for feedback correction, but MAP is particularly advantageous because the output of the engine portflow function $f_5$ is of primary importance for AFR control and depends on a good MAP value $P_{N3}$. The above Leunberger Observer scheme was chosen to minimize error in $f_5$ at steady state, and distribute the corrections for the error throughout the rest of the model according to the Leunberger gains L.

Since the inclusion of a barometric pressure sensor desirably is avoided, the barometric pressure input $P_{N1}$ to the model must be estimated in practice. This is accomplished by forcing the following equation to a minimum by adjusting the $\overline{P}_{N1}$ input (the estimated barometric pressure) to the Leunberger Observer as follows.

$$\min\begin{bmatrix} f_5(\overline{P}_{N3},\overline{P}_{N5},T_{N3},N_e,\theta_{cam}) - F_{16} - f_8(\overline{P}_{N5},\overline{P}_{N3},T_{N5},\theta_{egr}) - \\ f_3(\overline{P}_{N1},\overline{P}_{N3},T_{N2},\theta_{tp}) - f_4(\overline{P}_{N1},\overline{P}_{N3},T_{N2},\theta_{iac}) \end{bmatrix}. \tag{30}$$

The above assumes that in implementation, node N2 will be lumped to node N1 (as discussed earlier) making the equivalent throttle and IAC flow a direct function of $\overline{P}_{N1}$.

Minimizing the above expression via adjustment to $\overline{P}_{N1}$ simply means that the fresh air flow into the engine must balance with the fresh air flow through the IAC and throttle valve (mass conservation). The above expression is only true at steady-state conditions, so iterations on $\overline{P}_{N1}$ are done only where $\dot{\overline{P}}_{N3}$ is very small. Mass conservation was inherent in the Model equations 18–23 even in the presence of model inaccuracies and barometric pressure input error, but the act of constraining the modeled MAP $\overline{P}_{N3}$ to the measured MAP upsets the "model mass balance" which is presumed to be off entirely because of error in $\overline{P}_{N1}$. For this reason the above steady-state mass conservation constraint was placed on the Leunberger Observer equations.

Figure 6:
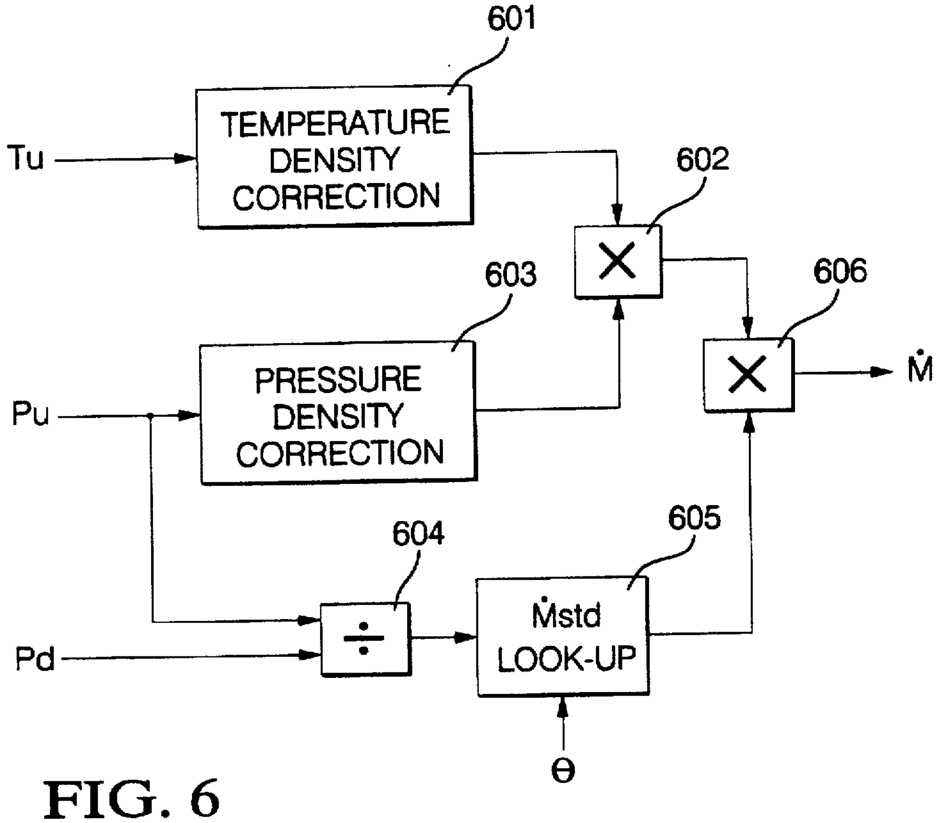
FIG. 6 is a signal flow diagram for carrying out gas mass flow estimations through various pneumatic elements in accord with the present invention.
Figure 7:
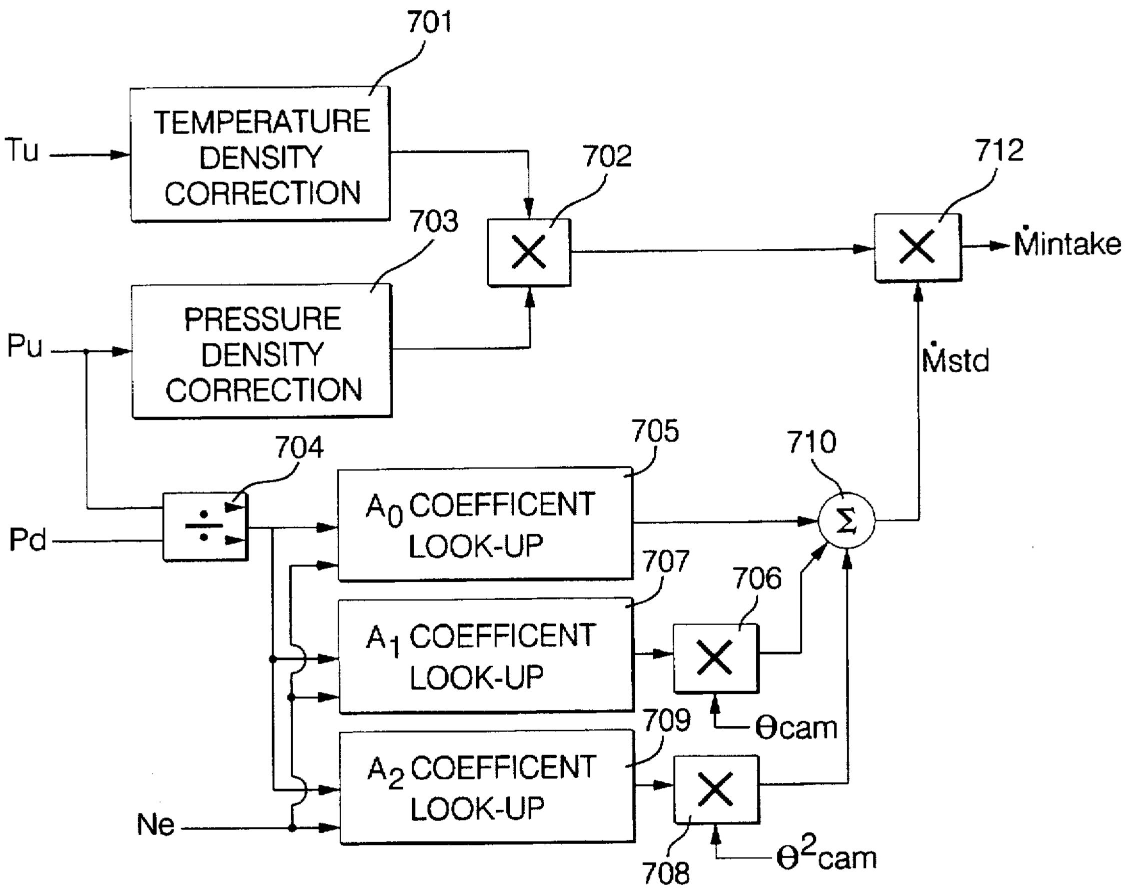
FIG. 7 is a signal flow diagram for carrying out gas mass flow estimations through a variable cam phaser equipped engine in accord with the present invention.
Figure 8:
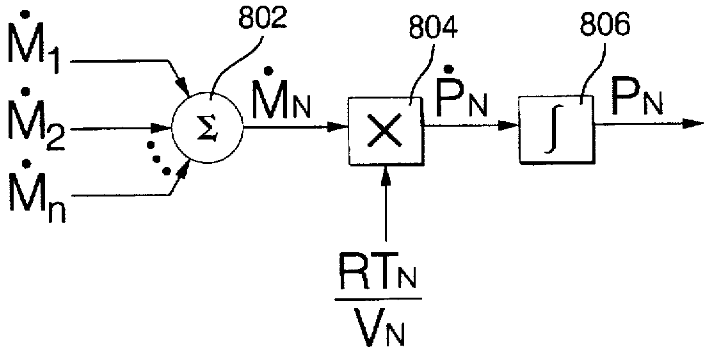
FIG. 8 is a signal flow diagram for carrying out pressure rate of change and pressure estimations at various areas of the engine system in accord with the present invention.

With reference now to FIGS. 6–8, signal flow diagrams illustrate a signal flow process in accord with a preferred embodiment of the present invention. FIG. 6 particularly is illustrative of gas mass flow estimation through a variable geometry pneumatic resistance element as previously described. Predetermined input signals include temperature upstream from the element, $T_u$, pressure upstream from the element, $P_u$, pressure downstream from the element, $P_d$, and an input representative of the element restriction geometry, $\theta$. Upstream temperature is applied to block 601 whereat a temperature density correction factor is determined from a schedule of such density correction factors relating standard temperature conditions to upstream temperatures. Similarly, upstream pressure is applied to block 603 which returns a pressure density correction factor relating standard pressure conditions to upstream pressures. These two density correction factors are then multiplied at block 602 to yield an overall density correction factor. Upstream pressure is also applied along with downstream pressure to block 604 which returns a ratio of the two pressures. The pressure ratio is next applied to a standard gas mass flow table to look up the standard gas mass flow through the element. The standard gas mass flow and the overall density correction factor are multiplied at block 606 to establish the gas mass flow through the element.

The standard gas mass flow table is advantageously developed for each element through a conventional bench calibration process alleviating cumbersome on vehicle calibrations. Such calibration process generally includes progressive nested incremental adjustments to the variable quantities and monitoring and recording the gas mass flow output response of the element. The calibration process is performed at standard conditions or corrected for standard conditions. A look-up table is then constructed from the collected response data. In the present exemplary embodiment, the standard gas mass look-up table comprises a three-dimensional data set having independent variables comprising the pressure ratio and restriction geometry. As previously alluded to, the restriction geometry may be represented by the control signal applied thereto, such as a pulse width modulated valve, or may be represented by a transduced signal, such as is the case with a potentiometer providing a throttle position signal. In the case of a fixed geometry resistance element, the standard mass flow table may be constructed as merely two dimensional with the independent variable comprising pressure ratio and the dependent variable comprising standard gas mass flow. Similarly, pressure regulating resistance elements comprise a three dimensional look-up table wherein the upstream and downstream pressures comprise first and second independent variables and the dependent variable comprises standard gas mass flow. In the latter case, pressure density correction factors are inappropriate and therefore none are generated or applied.

In the exemplary situation wherein certain pneumatic volume nodes and flow branches may be combined or lumped so as to reduce the model complexity, and as specifically described with respect to the intake system of the present embodiment wherein flows $F_3$ and $F_4$ are related to pressure at node N1 as previously set forth, the calibration process is substantially similar but for the fact that the "element" utilized is actually the combination or lumped elements as described. Therefore, the standard gas mass flow tables for flows $F_4$ and $F_3$ embody the characteristics of the air cleaner 13, air inlet 11 and intake duct 17 in addition to, the respective characteristics of the IAC valve and throttle valve. Such element lumping may be reflected in table combinations of individual elements through an analytical combination not requiring actual element combinations and bench calibration.

Each element in the System would have a correspondingly similar signal flow and resultant gas mass flow developed therefrom.

FIG. 7 is particularly illustrative of forced gas mass flow estimation through a pneumatic flow source element as previously described. More specifically, the signal flow illustrated corresponds to the engine cylinders. Predetermined input signals include temperature upstream from the element or intake manifold temperature, $T_m$, pressure upstream from the element or intake manifold pressure, $P_m$, pressure downstream from the element or exhaust manifold pressure, $P_e$, engine speed $N_e$, and an input representative of the cam phase angle deviation from a standard angle, $\theta$. Intake manifold temperature is applied to block 701 whereat a temperature density correction factor is determined from a schedule of such density correction factors relating standard temperature conditions to intake manifold temperatures. Similarly, intake manifold pressure is applied to block 703 which returns a pressure density correction factor relating standard pressure conditions to intake manifold pressures. These two density correction factors are then multiplied at block 702 to yield an overall density correction factor. Intake manifold pressure is also applied along with exhaust manifold pressure to block 704 which returns a ratio of the two pressures.

Blocks 705–710 provide the standard gas mass flow as follows. Blocks 705, 707 and 709 provide respective coefficients of a second order expression of standard gas mass flow as a function of the pressure ratio, engine speed, and cam phase angle deviation from a standard angle. The general form of a second order expression in accordance with the present embodiment is as follows:

$$\dot{M}_{std}=A_0+A_1\theta+A_2\theta^2 \tag{31}$$

where $A_0$, $A_1$ and $A_2$ are respective functions of the pressure ratio and engine speed. Each respective block 705, 707, and 709 is represented by a corresponding three dimensional table with respective independent variables comprising pressure ratio and engine speed and respective dependent variables comprising the respective coefficient. After the coefficients are determined, the first and second order coefficients are multiplied by the cam phase signal $\theta_{cam}$ and square of the cam phase signal $\theta^2_{cam}$, respectively. The resultant respective signals are summed at summing node 710 to provide the standard gas mass flow from the engine. The standard gas mass flow and the overall density correction factor are multiplied at block 712 to establish the gas mass flow into the engine. This 2nd order equation form is an approximation to the kinematic Cosine curve relationship between piston position at bottom dead center and an intake valve open event.

The standard gas mass flow coefficient tables are advantageously developed for each flow source element through a conventional bench calibration process alleviating cumbersome on vehicle calibrations. Such calibration process generally includes progressive nested incremental adjustments to the variable quantities and monitoring and recording the inlet gas mass flow and exhaust manifold pressure response. The calibration process is performed at standard conditions or analytically corrected to standard conditions. A look-up table is then constructed from the collected response data. In the present exemplary embodiment, the standard gas mass look-up table comprises a three-dimensional data set having independent variables comprising the pressure ratio and flow-source pumping speed. As previously alluded to, the cam phase angle may be represented by the control signal applied to the cam phaser mechanism or a control position feedback signal from the phaser. In the case of a fixed phase cam, the standard gas mass flow may be derived from a three dimensional table constructed with the independent variables comprising the pressure ratio and engine speed and the dependent variable comprising standard gas mass flow into the engine.

Each flow source element in the System would have a correspondingly similar signal flow and resultant gas mass flow developed therefrom.

FIG. 8 is particularly illustrative of a node pneumatic state model of pressure rate of change and pressure for a particular pneumatic capacitive element as previously described. Predetermined input signals include gas mass flows at the element ports and a volumetric damping factor specifically corresponding to the particular node. Predetermined gas mass flows are input to summing node 802 to provides a net gas mass flow at the node N associated with the pneumatic capacitance element. The net gas mass flow signal is multiplied by the volumetric damping factor at block 804. The output signal from block 804 is the pressure rate of change at the node N. The pressure rate of change signal is applied to numerical integrator block 806 to provide a pressure signal therefrom.

The volumetric damping factor may be established as a function of the known geometric volume of the pneumatic capacitive element or may alternatively be established through a calibration process which would account for higher order dynamic effects and result in a volumetric damping factor based upon an effective volume.

The signal flow diagrams of FIGS. 6–8 are coupled such that the predetermined pressure input signals to the gas mass flow estimators are provided by the node pneumatic state estimators and the predetermined gas mass flow input signals to the node pneumatic state estimators are provided by the gas mass flow estimators.

Figure 4:
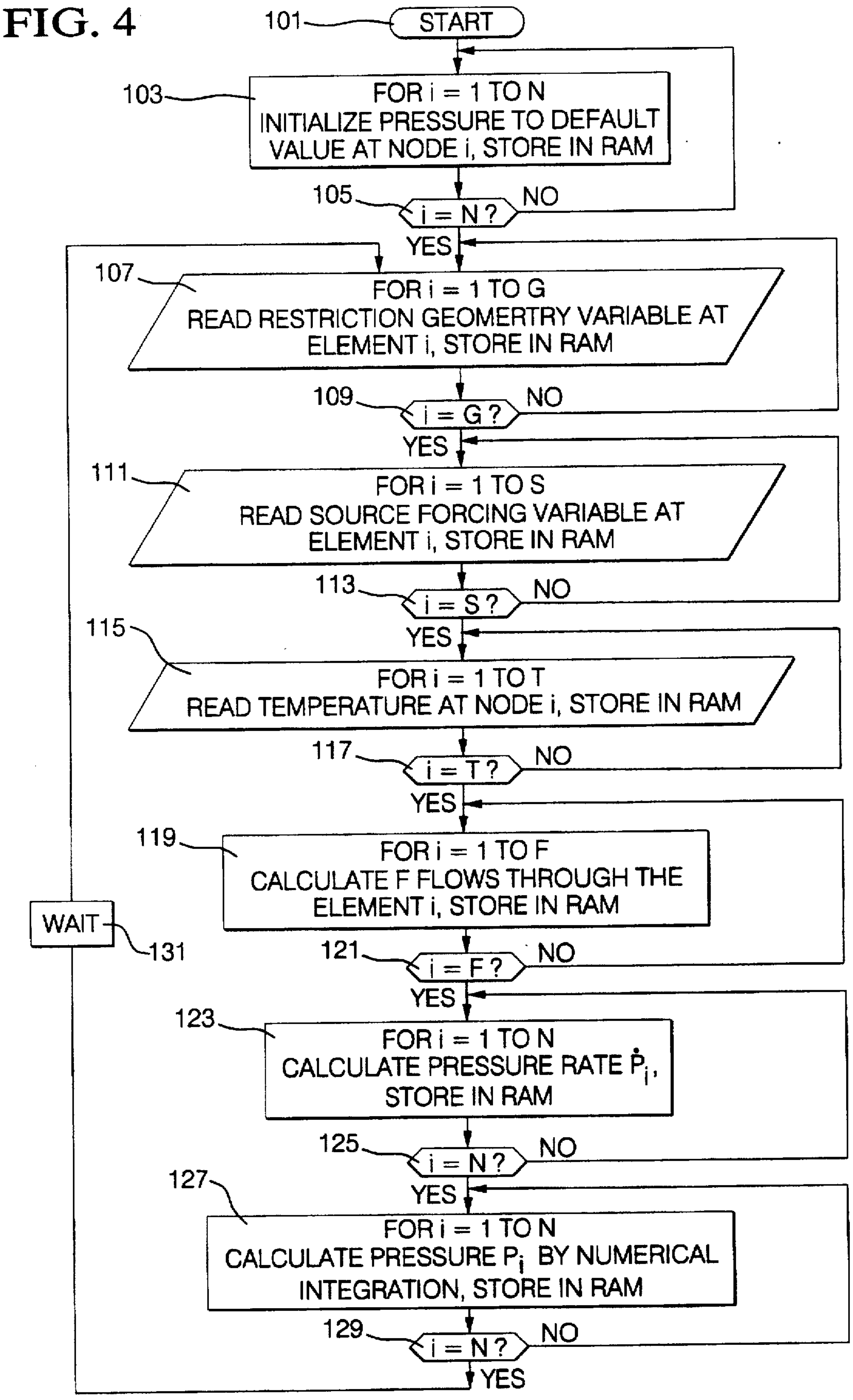
FIG. 4 is a flow diagram representing a set of program instructions for execution by a computer based control module in carrying out the present invention.

With reference now to the flow diagram of FIG. 4, a set of program instructions for execution by the computer based powertrain control module (PCM) designated 93 in FIG. 5 and repetitively executed in carrying out the present invention is illustrated. The operations performed by specific computer instructions as embodied in the flow diagram generally carry out the functions of the signal flow diagrams illustrated in the various FIGS. 6 through 8 and in accordance with the general relationships embodied in the equations (18) through (23). The instructions are part of a much larger set of instructions, including a background routine for performing various well known functions such as diagnostics, input and output functions including, where appropriate, sensor signal conditioning, filtering and A/D and D/A conversions. The majority of the routine of FIG. 4, blocks 107–131 in particular, may be executed at regular intervals as part of an instruction loop or alternatively as part of a software interrupt routine. Blocks 101–105 are generally illustrative of a portion of an instruction set executed once during each vehicle ignition cycle to initialize various registers, counters, timers etc., in preparation for the repetitively executed routines to follow.

Beginning with an ignition cycle, block 101 represents entry into the instruction steps executed by the PCM. Blocks 103 and 105 represent instructions executed to initialize pressure states at the various N areas of the internal combustion engine System designated as pneumatic volume nodes.

The initialization routine embodying initialization steps 103 and 105 also initialize various interrupt timers including an interrupt timer for calling the routine designated by blocks 107–131. Though not separately shown in the flow diagram of FIG. 4, it is well known that a background routine conventionally reads in and conditions a variety of engine transducer signals including coolant temperature, engine speed, outside air temperature, and manifold absolute pressure. These sensor inputs are assumed to be derived in accordance with well known practices during regular intervals and updated as frequently as the particular quantity requires.

Of particular relevance in the present embodiment is the initial value for MAP. At start up conditions, that is to say at a time subsequent power up of the powertrain control module and preceding engine combustion, MAP is at steady state and is substantially equivalent to barometric pressure. All pressure node variables are set to this initial pressure value.

Upon the calling of the interrupt routine illustrated, blocks 107–129 are repetitively executed as follows. First, block 107 represents program instructions for reading variable geometry variables associated with the various flow resistance elements having such variable geometries and storing the variables in temporary memory locations for further processing. After all variables are read and stored, blocks 111 and 113 represents program instructions for reading the various flow source pneumatic elements variables including engine speed and cam phase angle and storing the variables in temporary memory locations for further processing. Initially, engine RPM is zero and then increases as the engine is cranked. Blocks 115 and 117 are next executed to determine temperatures at the various areas of the internal combustion engine System designated as pneumatic volume nodes and store the variables in temporary memory locations for further processing. The temperatures in the present embodiment are supplied as approximations from empirically determined functions of coolant temperature and intake air temperature.

Blocks 119 and 121 next performs calculations of the various gas mass flows through the pneumatic resistance elements and stores them in temporary memory locations for further processing. The steps associated with blocks 119 and 121 include generally the signal flow steps associated with the diagram illustrated in FIGS. 6 and 7. The pressure values required by the various flow calculations are the pressure values stored in a previously executed interrupt routine. During the initial running of the routine, all pressure values are set to the initially read MAP value. All flows will calculate out to zero. As the engine RPM comes up with engine cranking, flows through the engine are forced starting at the flow-source elements. As the flow sources begin removing or adding mass flow from/to the volumes, the pressures begin to change, causing the resistive elements to pass flow. Certain of the flow terms in the set of coupled equations (18) through (23), being functions of RPM, begin to reflect the forced flows.

Blocks 123 through 129 include steps for calculating pressure rates of change at the various areas of the internal combustion engine System designated as pneumatic volume nodes. These steps also include the steps for numerical integration of the pressure rates of change to estimate the pressures at the respective nodes. Blocks 123 through 129 include generally the signal flow steps associated with the diagram illustrated in FIGS. 8. The pressures so calculated are stored in temporary memory locations and comprise the pressures used in the next interrupt routine by the gas mass flow calculation steps embodied in blocks 119 and 121. As mentioned, during the initial running of the routine, all pressure values are set to the initially read MAP value and all flows will calculate out to zero. Therefore, all pressure rates of change will initially calculate out to zero. As the engine RPM comes up with engine cranking, flows through the engine are forced. Certain of the flow terms in the set of coupled equations (18) through (23) being functions of RPM or in the case of other flow-source elements being functions of respective forcing inputs begin to reflect the forced flows which in turn effect the pressure rate of change terms and the pressure terms integrated therefrom. Continuously during steady state engine operation, MAP readings may be compared with the state estimated pressure for the intake manifold node N3. If needed, adjustments may be made to the pressure rate of change for node N3 in accordance with errors between the MAP and state values to correct for cumulative errors or other divergence of the state estimate value and the measured MAP. The general effect is that the modeled MAP is equivalent to the measured MAP at steady-state, but leads the measurement during transients.

Finally, block 131 represents a wait state for the interrupt routine throughout which a variety of other PCM functions are being performed as well known in the art. Upon the repetitive expiration of the associated interrupt timer, block 131 allows execution of the instruction set comprising blocks 107 through 129 as described to provide for regularly updated pneumatic states in accordance with the present invention.

Various ones of the pressures, pressure rates of change and flows are utilized by the control block 97 illustrated in FIG. 1 in carrying out various engine control function. For example, the flow through the intake port—$F_5$—is used in conventional fueling control in accordance with well understood performance, economy and emission objectives. In practice for fueling control, F5–F8 is used in order that fuel is added only with respect to the portion of the flow which is fresh air. The exhaust gas recirculation flow—$F_8$—is similarly employed in treatment of exhaust gas constituents in accordance with well understood emission objectives. In short, the outputs from the pneumatic state model comprising pressure, pressure rate of change and flow are input to an engine control block for controlling various engine functions as well known to one having ordinary skill in the art.

While the invention has been described with respect to certain preferred embodiments, it is envisioned that various modifications may be apparent to one having ordinary skill in the art. As such, the embodiments described herein are offered by way of example and not of limitation.

I claim:

1. A method for determining pneumatic states in an internal combustion engine system, the internal combustion engine system including a plurality of pneumatic elements having gas flow ports and a plurality of pneumatic flow branches for coupling gas flow between various ones of the plurality of pneumatic elements, the method comprising:

designating at least one location in the internal combustion engine system as a pneumatic node;

providing respective sets of pneumatic parameters associated with selected ones of said plurality of pneumatic elements that are coupled to said at least one pneumatic node; and determining a first pneumatic state at said at least one pneumatic node from a set of predetermined relationships of said respective sets of pneumatic parameters.

2. The method of determining pneumatic states as claimed in claim 1 wherein said first pneumatic state comprises a pressure change with respect to a predetermined interval, and said step of determining comprises the steps of determining a respective gas mass flow through each of said selected ones of said plurality of pneumatic elements from each respective set of pneumatic parameters and aggregating said respective gas mass flows to establish a net gas mass flow.

3. The method of determining pneumatic states as claimed in claim 1 wherein said first pneumatic state comprises a pressure change with respect to a predetermined interval, and said respective sets of pneumatic parameters comprise predetermined port pressures of respective ones of said selected ones of said plurality of pneumatic elements.

4. The method of determining pneumatic states as claimed in claim 2 further comprising the steps of providing a damping factor as a predetermined volumetric function of said pneumatic node, and applying the damping factor to said net gas mass flow.

5. The method of determining pneumatic states as claimed in claim 1 wherein said step of providing respective sets of pneumatic parameters comprises providing predetermined respective port pressures for each one of said selected ones of said plurality of pneumatic elements.

6. The method of determining pneumatic states as claimed in claim 5 wherein at least one of said selected ones of said plurality of pneumatic elements comprises a flow restriction apparatus variable to establish a flow restriction condition therethrough, and said step of providing respective sets of pneumatic parameters further comprises providing said flow restriction condition for said flow restriction apparatus.

7. The method of determining pneumatic states as claimed in claim 6 wherein said flow restriction apparatus comprises an intake air throttle.

8. The method of determining pneumatic states as claimed in claim 6 wherein said flow restriction apparatus comprises an exhaust gas recirculation valve.

9. The method of determining pneumatic states as claimed in claim 6 wherein said flow restriction apparatus comprises an idle air bypass valve.

10. The method of determining pneumatic states as claimed in claim 5 wherein at least one of said selected ones of said plurality of pneumatic elements comprises a pneumatic pump to establish a flow condition therethrough in accord with pneumatic pump speed, and said step of providing respective sets of pneumatic parameters further comprises providing said pneumatic pump speed.

11. The method of determining pneumatic states as claimed in claim 10 wherein said pneumatic pump comprises a combustion cylinder including a piston reciprocating therein.

12. The method of determining pneumatic states as claimed in claim 10 wherein said pneumatic pump comprises a supercharger.

13. The method of determining pneumatic states as claimed in claim 10 wherein said pneumatic pump comprises a turbocharger.

14. The method of determining pneumatic states as claimed in claim 10 wherein said pneumatic pump comprises an air injection reaction pump.

15. The method of determining pneumatic states as claimed in claim 1 further comprising the step:

determining a second pneumatic state at said pneumatic node as a predetermined function of said first pneumatic state.

16. The method of determining pneumatic states as claimed in claim 15 wherein said first pneumatic state comprises a pressure change with respect to a predetermined interval, said step of determining the first pneumatic state comprises the steps of determining a respective gas mass flow for each respective set of pneumatic parameters and aggregating said respective gas mass flows to establish a net gas mass flow, said second pneumatic state comprises a pressure, and said step of determining the second pneumatic state comprises the step of determining a numeric integral of said first pneumatic state.

17. The method of determining pneumatic states as claimed in claim 15 wherein said first pneumatic state comprises a pressure change with respect to a predetermined interval, and said respective sets of pneumatic parameters comprise predetermined port pressures of respective ones of said selected ones of said plurality of pneumatic elements, said first pneumatic state comprises a pressure, and said predetermined function of said first pneumatic state comprises a numeric integration of said first pneumatic state.

18. The method of determining pneumatic states as claimed in claim 16 further comprising the steps of providing a damping factor as a predetermined volumetric function of said pneumatic node, and applying the damping factor to said net gas mass flow.

19. The method of determining pneumatic states as claimed in claim 15 wherein said step of providing respective sets of pneumatic parameters comprises providing predetermined respective port pressures for each one of said selected ones of said plurality of pneumatic elements.

20. The method of determining pneumatic states as claimed in claim 19 wherein at least one of said selected ones of said plurality of pneumatic elements that are coupled to said at least one pneumatic node comprises a flow restriction apparatus variable to establish a flow restriction condition therethrough, and said step of providing respective sets of pneumatic parameters further comprises providing said flow restriction condition for said flow restriction apparatus.

21. A method of determining pneumatic states in an internal combustion engine system, the internal combustion engine system including a plurality of pneumatic elements having gas flow ports and a plurality of pneumatic flow branches for coupling gas flow between various ones of the plurality of pneumatic elements, the internal combustion engine system being effective to controllably circulate gas masses therethrough, the method comprising the steps:

designating a plurality of locations the internal combustion engine system as respective pneumatic nodes;

for each respective pneumatic node;

providing respective sets of pneumatic parameters associated with selected ones of said plurality of pneumatic elements that are coupled to the respective pneumatic node;

determining respective gas mass flows through each of said selected ones of said plurality of pneumatic elements as a respective predetermined function of each respective set of pneumatic parameters;

aggregating said respective gas mass flows to establish a net gas mass flow;

determining pressure changes with respect to predetermined intervals from said net gas mass flow; and determining pressure as a predetermined integral function. of said pressure changes.

22. The method of determining pneumatic states as claimed in claim 21 further comprising the steps for each respective pneumatic node of:

providing a respective damping factor as a predetermined volumetric function of the respective pneumatic node; and applying the damping factor to said net gas mass flow.

23. The method of determining pneumatic states in an internal combustion engine system as claimed in claim 21 wherein the step of determining respective gas mass flows comprises the steps:

determining respective standard gas mass flows for standard pneumatic conditions as a respective predetermined functions of each respective set of pneumatic parameters, and correcting said respective standard gas mass flows for actual pneumatic conditions to thereby provide respective gas mass flows.

24. A method of determining pressure at predetermined areas within an internal combustion engine, each predetermined area being coupled to a respective plurality of pneumatic elements, the method comprising the steps:

estimating all significant gas mass flows into and out of each predetermined area from respective sets of pneumatic parameters associated with the respective plurality of pneumatic elements coupled to each area;

for each predetermined area, summing respective estimated significant gas mass flows; and determining pressure at each predetermined area as a predetermined function of the respective summations of said estimated gas mass flows.

25. The method of determining pressure at predetermined areas within an internal combustion engine system as claimed in claim 24 wherein the step of estimating all significant gas mass flows includes estimating individual ones of said significant gas mass flows in accordance with respective predetermined functions of the determined pressures of the ones of said predetermined areas at opposite ends of each respective significant gas mass flow.

* * * * *